Aug. 11, 1925.  
W. B. ENGLER  
1,549,471  
AUTOMATIC DUMPING MECHANISM  
Filed Dec. 26, 1923 3 Sheets-Sheet 1
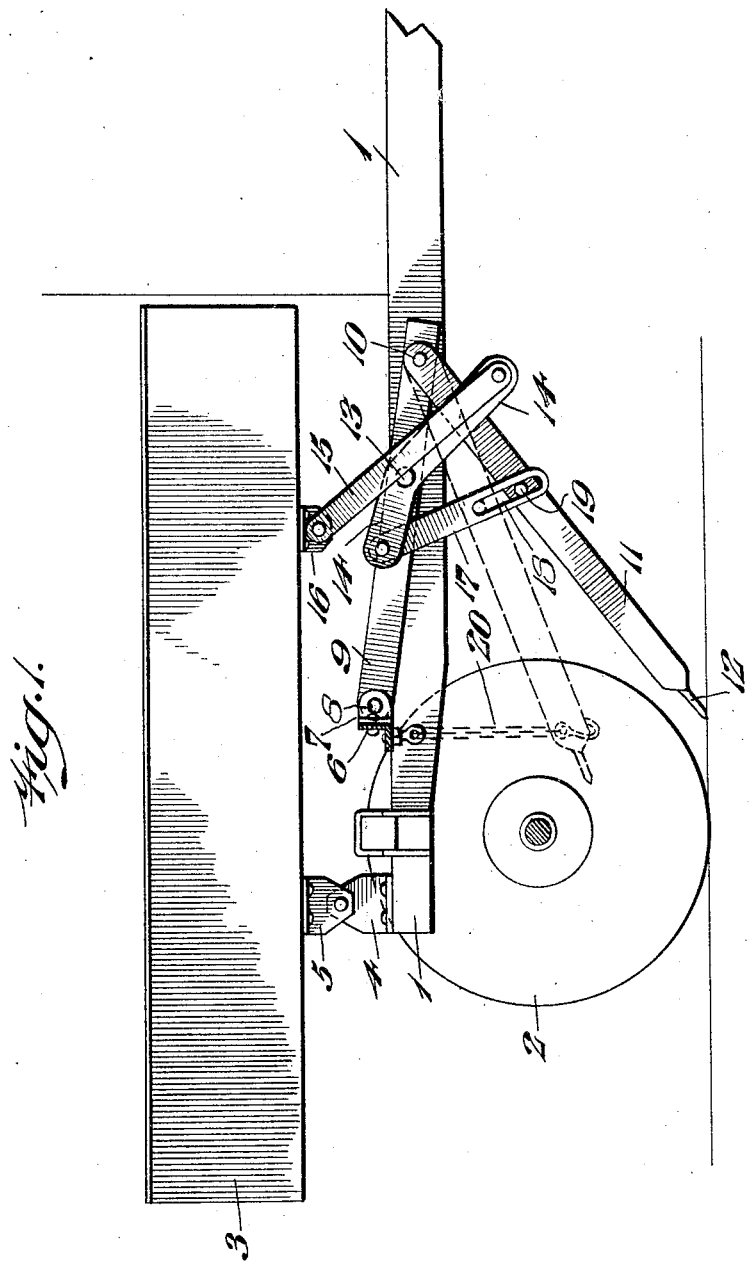
INVENTOR:  
William B. Engler.  
BY Diedersheim + Fairbanks  
ATTORNEYS.

Aug. 11, 1925.
W. B. ENGLER
1,549,471
AUTOMATIC DUMPING MECHANISM
Filed Dec. 26, 1923
3 Sheets-Sheet 2
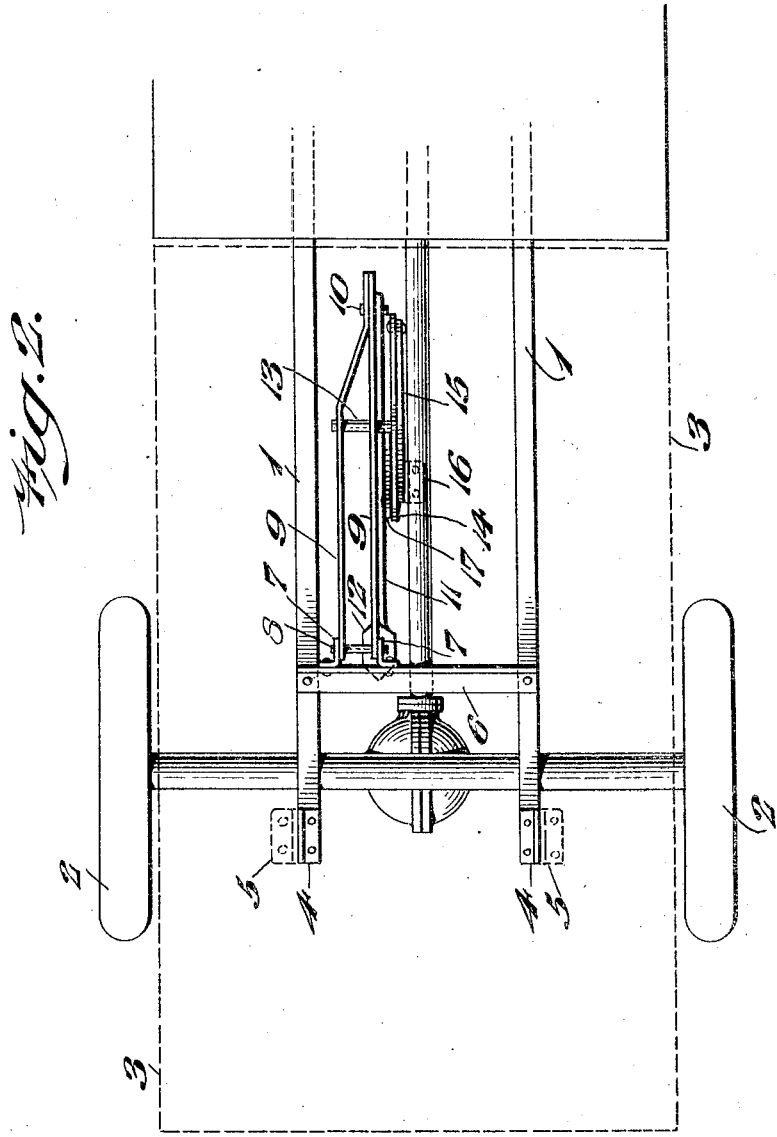
INVENTOR:
William B. Engler.
BY Wiedersheim & Fairbanks
ATTORNEYS.

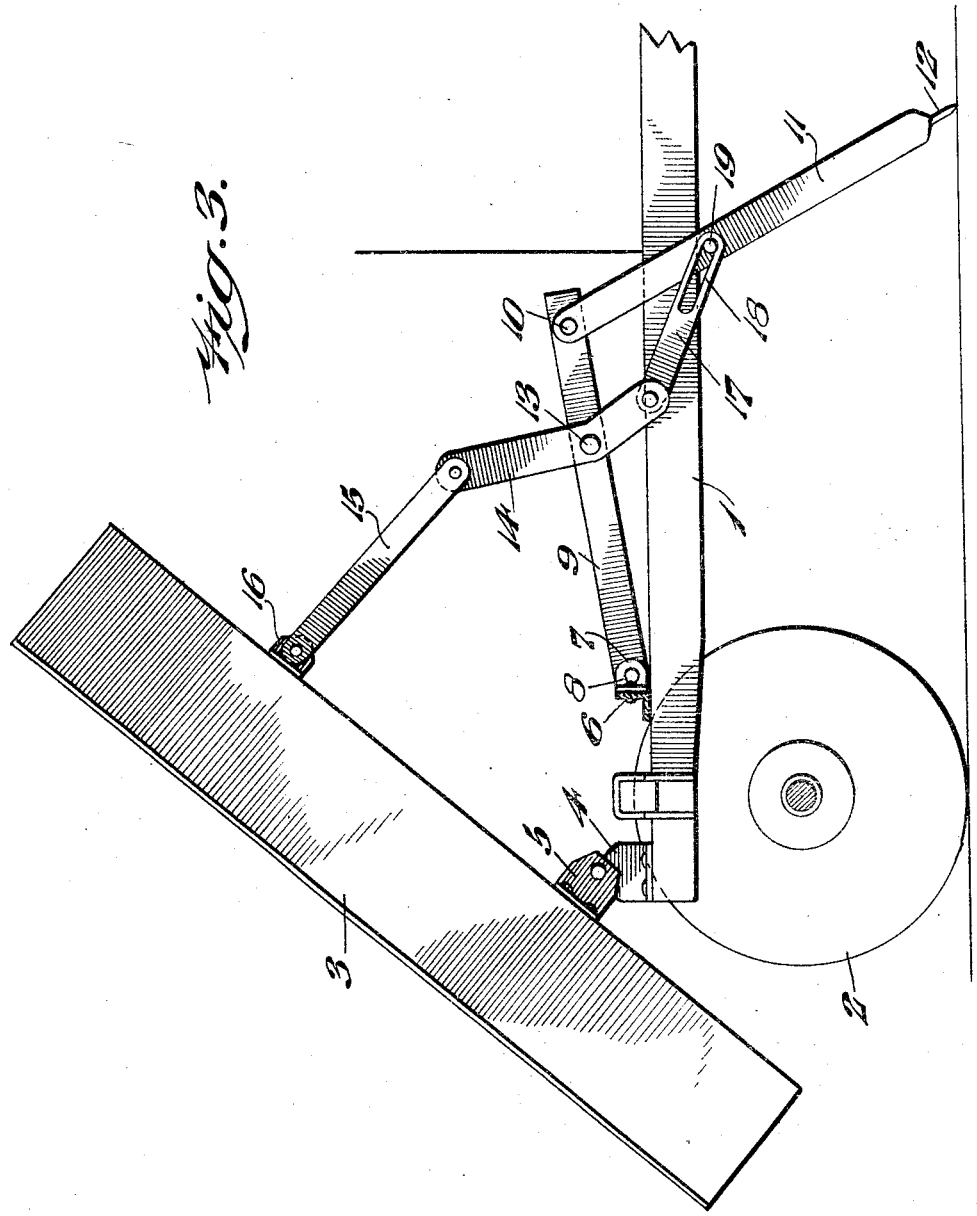

Patented Aug. 11, 1925.

1,549,471

UNITED STATES PATENT OFFICE.

WILLIAM B. ENGLER, OF WATERLOO, NEW YORK.

AUTOMATIC DUMPING MECHANISM.

Application filed December 26, 1923. Serial No. 682,705.

*To all whom it may concern:*

Be it known that I, WILLIAM B. ENGLER, a citizen of the United States, residing at Waterloo, county of Seneca, State of New York, have invented certain new and useful Automatic Dumping Mechanism, of which the following is a specification.

This invention, generally stated, relates to automatic dumping mechanism and has more especial relation to unloading of a tiltable receptacle capable of forward and backward propulsion.

The leading object of the invention may be said to reside in the automatic tilting of such receptacle for dumping purposes when the conveyance, upon which it is mounted, is subjected to a retrograde movement and mainly through the medium of a sprag or equivalent device arranged to contact with the surface over which the conveyance moves, and so dump said receptacle.

The nature, characteristic features and scope of the invention will be more fully understood from the following description taken in connection with the accompanying drawings forming part hereof, and in which:

Fig. 1, is a view in side elevation, more or less diagrammatically shown, of a conveyance equipped with dumping mechanism and illustrative of one type of embodiment of the present invention.

Fig. 2, is a top or plan view thereof, certain of the parts being shown in dotted line for the sake of clearer illustration, and Fig. 3, is a view in side elevation illustrating the parts shown in the foregoing figures moved to dumping position.

For the purpose of illustrating my invention I have shown in the accompanying drawings one form thereof which is at present preferred by me, since the same has been found in practice to give satisfactory and reliable results, although it is to be understood that the various instrumentalities of which my invention consists can be variously arranged and organized and that the invention is not limited to the precise arrangement and organization of the instrumentalities as herein shown and described.

For the purposes of illustrating an embodiment of the present invention, I have selected a self-propelled vehicle having a dump-body although obviously the mechanism of the invention is applicable to other uses. Referring now to the drawings in detail the numeral 1, designates the frame of a motor-vehicle chassis and the numeral 2, the rear wheels. Supported upon the frame 1, so as to be capable of movement in an arc of a circle, in a vertical plane, is a dump-body 3. The means of movable connection is arranged at the rear end of frame 1 and comprises a hinged or pivotal arrangement of parts. As shown, a bracket 4, is fixed to each side rail of the chassis frame and depending brackets 5, are fixed to the underside of the body 3, and pivot pins connect the respective pairs of brackets to form hinge or pivot joints. Connecting the side rails of frame 1, adjacent the hinge connection just referred to, is a cross-member 6 of angle-iron, having ears 7 fixed thereto, to which ears are pivoted, as at 8, spaced bars 9 which converge at their outer ends and have pivoted thereto, as at 10, one end of a sprag 11, the opposite end of which is pointed at at 12, for engagement with the ground when in use. Pivoted with respect to said bars 9, as at 13, is a rocker-arm 14, one end of which has pivoted thereto a link 15, which in turn has hinged relation, as at 16, with the underside of body 3, and the opposite end of which has pivoted thereto a link 17, which in turn has a slotted portion 18 for co-acting with a pin 19 fixed to the sprag 11. When the sprag is not in use it is supported free of the ground, as shown by dotted lines in Fig. 1, by any suitable means, as a chain 20, suspended from cross-piece 6.

In use the sprag 11 is lowered so that its pointed end may be engage the ground, the slot and pin connection 18—19, permitting this movement. In this position of the sprag, the conveyance is propelled in a retrograde manner whereupon the free ends of spaced bars 9 are forced upwardly in an arc of a circle, said bars carrying with them the rocker-arm 14. As the conveyance moves rearwardly (which is equivalent to moving the lower end of the sprag forwardly along the ground) the rocker arm 14 is moved about its pivot point, through the instrumentality of the link 17, whereupon the link 15 functions to raise body 3 around its hinged connection to tilt the body and dump its contents, the entire operation of the system of levers being automatic. To reseat or return to normal position the body 3, the vehicle is propelled forwardly whereupon said system of levers assume their original or normal position and the sprag 11, is secured free of the ground.

Having thus described my invention, what I claim as new and desire to secure by Letters Patent, is:

1. In apparatus of the character stated the combination of a vehicle frame adapted for forward and rearward movement, and a vehicle body having hinged relation therewith adjacent its rear end, with, a lever pivoted at one end to said frame and pivotally supporting at its free end a sprag adapted in use to engage the ground and a system of levers including a slot and pin arrangement operatively connecting said sprag and lever with said body, said parts being adapted to tilt said body during retrograde movement of the frame.

2. In apparatus of the character stated, the combination of a vehicle frame adapted for forward and rearward movement, a vehicle body having hinged relation therewith adjacent its rear end, a lever pivoted at one end to said frame and pivotally supporting at its free end a sprag provided with a lateral pin said sprag being adapted in use to engage the ground, a link pivoted to said body, a bell-crank fulcrumed to said lever and pivoted at one end to said link, and a slotted link pivoted at one end to said bell-crank and having its slotted end in engagement with the lateral pin on said sprag, said parts being adapted to tilt said body during retrograde movement of the frame.

In testimony whereof I have hereunto signed my name.

WILLIAM B. ENGLER.

Witnesses:
J. WILLARD HUFF,
MADRITH COUGHLIN.